UNITED STATES PATENT OFFICE 2,398,426

CHEMICAL COMPOSITION

William E. Hanford, Wilmington, Del., assignor to E. I. du Pont de Nemours & Company, Wilmington, Del., a corporation of Delaware No Drawing. Application May 22, 1942,
Serial No. 444,110

11 Claims. (Cl. 260—513)

This invention relates to a telomerization process for the production of organic sulfur compounds from olefins and salts of sulfurous acids under high pressure conditions. More particularly, the invention relates to the production of alkanesulfonic acids and their salts.

The processes of the prior art for the direct production of organic sulfur compounds from olefins and salts of sulfurous acid or sulfur dioxide may be classified and described thus:

(A) Reaction of sulfur dioxide with olefins in the presence of organic peroxides, oxidizing acids or salts of the same, or actinic light at room temperature or thereabouts, resulting in the formation of polysulfone resins composed of repeating units of the olefin linked with sulfur dioxide, thus

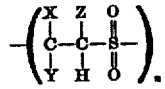

where X, Y, and Z may be H or alkyl groups and $n$ is an integer usually large, but never smaller than two.

(B) The reaction of olefins with water-soluble compounds capable of yielding bisulfite ions in the presence of catalysts such as organic peroxides and oxidizing agents at temperatures up to 150° C. and at low pressures with the production of salts of alkanesulfonic acids formed by the simple addition of one mole of bisulfite to one mole of the olefin.

In the above classes, the reactions involved are combinations of equimolar amounts of the sulfur compound to the olefins at the C=C group and no new C to C bonds are formed. The problem which confronted the present applicant was to devise a process for the production of organic sulfur compounds, especially salts of water-soluble sulfonic acids, containing high molecular weight alkyl groups from low molecular weight olefins particularly such as are available from the petroleum industry.

It has previously been discovered that, under the proper reaction conditions, ethylene will react with certain compounds such, for example, as carbon tetrachloride to produce hydrocarbon chains having a multiple of two carbon atoms and having portions of the second compound attached to the ends of the chains. The reaction has been called "telomerization" (from Greek telos, meaning "end" plus Greek mer meaning "part"). "Telomerization" is defined as the process of reacting, under polymerization conditions, a molecule YZ which is called a "telogen" with more than one unit of a polymerizable compound having ethylenic unsaturation called a "taxogen" to form products called "telomers," having the formula Y(A)$_n$Z wherein (A)$_n$ is a divalent radical formed by chemical union, with the formation of new carbon bonds, of $n$ molecules of the taxogen. The unit A is called a "taxomon," $n$ being any integer greater than one, and Y and Z being fragments of the telogen attached to the terminal taxomons.

It is an object of this invention to prepare alkanesulfonic acids and their salts from salts of sulfurous acid and olefins having fewer carbon atoms than the alkyl radical of the products. Another object is to prepare high molecular weight alkanesulfonic acids and their water-soluble salts from low molecular weight olefins, particularly such as are available from the petroleum industry. Other objects will appear hereinafter.

These objects are accomplished by reacting ethylene or propylene with a water-soluble salt of sulfurous acid at a temperature of 90° C. to 200° C. and a pressure of at least 400 atmospheres. The alkanesulfonic acid salts thus made can be transformed to the free acids by the action of concentrated hydrochloric acid.

A convenient method for carrying out the invention consists in charging a cold pressure vessel with the reactants, exclusive of the olefin, closing the vessel, and mounting it in a shaker machine. The system is pressured with sufficient olefin to give approximately the required pressure at the desired reaction temperature. The shaker machine is started, the pressure vessel is heated externally to the desired temperature, and the pressure is readjusted, if necessary, to the desired value. Temperatures, both inside and outside of the vessel, are measured by means of thermocouples, and the temperature, pressure, and time data are recorded as the reaction proceeds. The reaction usually proceeds with a decrease in pressure caused by absorption of the olefin, and the pressure in the system is maintained by pumping in more olefin. In some cases, it is necessary to reduce the external heat in order to compensate for the heat of the reaction when it is vigorously exothermic. When the reaction is complete, as indicated by the lack of further absorption of olefin, the heating is discontinued and, after the pressure vessel is cold, the excess gases are bled off, the vessel opened, and the contents discharged. The procedure for working up the products depends upon the nature of the same. A method which can be employed is to add water, unless a fair amount is already present, and filter the mixture from any insoluble material such as polyolefin (by-product) which may be present. The alkanesulfonates are present in the filtrate and can be obtained in the solid form together with any unreacted inorganic sulfite by evaporation of the filtrate. The free sulfonic acids can be obtained by treatment of the alkali salts with hydrochloric acid.

The reaction by which the alkanesulfonates and the corresponding sulfonic acids are obtained from ethylene is represented by the following equations:

$$nCH_2=CH_2 + NaHSO_3 \rightarrow H(CH_2CH_2)_nSO_3Na$$

$$H(CH_2CH_2)_nSO_3Na + HCl \rightarrow$$
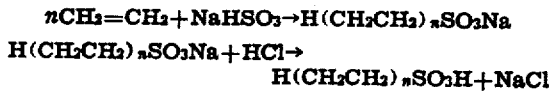
$$H(CH_2CH_2)_nSO_3H + NaCl$$

where $n$ is greater than one. As in the case of other telomerizations, the product does not consist of a single product, but a mixture of homologous compounds differing from one another in the value of $n$. Some polyethylene and some monoaddition product ($n=1$) may be formed as by-products.

The invention is more fully described in the following illustrative examples in which parts are given by weight unless otherwise noted.

*Example I*

A silver-lined pressure vessel is charged with 150 parts of water, 20 parts of sodium bisulfite, and 30 parts of carbon tetrachloride. The pH is adjusted to 3.20 with hydrochloric acid. The vessel which is filled to about one-half of its capacity with the above mixture is pressured to 500 atmospheres with ethylene and heated at 107–124° C. for 12 hours while the pressure, which rises upon heating, is maintained at 720–790 atmospheres. The total absorption is 1890 atmospheres. The reaction mixture is a wet mass with a pH of 2.98. It is filtered and the solid residue is thoroughly washed with water. The solid is dried and found to contain 18.77 per cent chlorine, but no sulfur. It amounts to 136 parts and appears to be an ethylene carbon tetrachloride telomer.

The aqueous filtrate and washings are combined and evaporated to dryness on a steam bath. A salt-like solid amounting to 24 parts is left as a residue. This solid is soluble in water to give a turbid solution which gives a foam when shaken. It is acidic to litmus; it does not liberate sulfur dioxide when acidified with hydrochloric acid; and it does not give a precipitate with calcium chloride. It, therefore, is not an inorganic sulfate. The product is mixed in a mortar with concentrated hydrochloric acid, filtered, the filtrate is evaporated on a steam bath to approximate dryness, and the residue is finally dried in vacuo (3 mm.) at 100° C. for 1 hour. A dark brown oil amounting to 15 parts is left. The oil is free of chloride ion and has a neutral equivalent of 120 (electrometric titration). This shows that the product contains

$$H(CH_2CH_2)_nSO_3H$$

where $n$ is greater than one. Dilute aqueous solutions of this acid give a strong foam when shaken.

*Example II*

A pressure vessel is charged as previously described with 50 parts of sodium bisulfite, 120 parts of water, 30 parts of isooctane, and heated at 119–121° C. under 895–990 atmospheres ethylene pressure for a period of 11 hours. The observed pressure drop is 130 atmospheres. The product is discharged from the reaction vessel and consists of two layers, but no precipitate. The mixture is evaporated to dryness on a steam bath and the residue is finally dried in a vacuum drier. The dried product consists of 62 parts of a white salt-like solid which contains the sodium salts of alkyl sulfonic acids. It is ground to a fine powder and agitated for 10–12 hours with a saturated solution of hydrogen chloride in methanol. The resulting slurry is filtered and the residue of sodium chloride is thoroughly washed with hydrogen chloride in methanol solution. The filtrate is evaporated under reduced pressure at a temperature ranging up to 100° C. until the residue is free from ionic chlorine. Twenty-seven (27) parts of a brown grease-like residue having a neutral equivalent of 154 are left. This product which is a mixture of alkanesulfonic acids of type $H(CH_2CH_2)_nSO_3H$ where the average value of $n$ is approximately three is readily soluble in water to give a solution which forms a good foam when shaken.

*Example III*

A pressure vessel is charged as previously described with 50 parts of sodium bisulfite, 120 parts of water, 2 parts of carbon tetrachloride, and 30 parts of isooctane. It is heated at 118–121° C. under 860–945 atmospheres of ethylene pressure for 12 hours during which time 120 atmospheres of ethylene are absorbed. The crude reaction mixture is discharged from the pressure vessel and consists of two liquid layers and a small amount of a precipitate. The mixture is filtered and the filtrate is evaporated on a steam bath and the residual salt-like product containing sodium alkanesulfonates is dried in vacuo. This product, which amounts to 62 parts, is ground to a fine powder and treated with methanol-hydrogen chloride solution as described under Example II. The free alkanesulfonic acid thus obtained amounts to 29.5 parts, is a jelly-like amber colored solid, and has a neutral equivalent of 173. This corresponds to an average molecular weight of between hexanesulfonic acid (166) and octanesulfonic acid (194).

*Example IV*

A pressure vessel is charged as previously described with 20 parts of sodium sulfite, 160 parts of water, and 0.5 part of ascaridole. The vessel is closed in the usual manner, 25 parts of carbon dioxide are pumped in, and the vessel is heated at 119–120° C. in the presence of enough ethylene to maintain a total pressure of 890–985 atmospheres for 10.75 hours. During this time, the total pressure drop is 125 atmospheres. The crude reaction mixture consists of a liquid and a white precipitate. The mixture is filtered, the precipitate washed with water and dried, after which it weighs 8.5 grams and is shown to be polyethylene. The filtrate is evaporated to dryness, leaving 28 parts of a white salt-like solid containing sodium alkanesulfonates. This is converted to the free sulfonic acid by the process of Example II, yielding 16 parts of a brown, grease-like solid which has a neutral equivalent of 195 corresponding to a sulfonic acid of the formula $H(CH_2CH_2)_nSO_3H$ in which the average value of $n$ is 4. This product is readily soluble in water to give a solution which forms a foam when shaken.

Example V

A pressure vessel is charged with 20 parts of potassium meta-bisulfite ($K_2S_2O_5$), 175 parts of water, and 2 parts of carbon tetrachloride. The pH of this mixture is 4.15. The vessel is closed and heated to 119–121° C. under 850–950 atmospheres of ethylene pressure for about 10 hours during which time the total pressure drop is 350 atmospheres. The crude reaction product is a slurry with a pH of 4.00. The mixture is filtered, the precipitate washed with water and dried, leaving 23 parts of solid. The filtrate is evaporated to dryness, leaving 23.5 parts of solid containing potassium alkanesulfonates. The sulfonates are converted to the corresponding free acids by the process described in Example II. The free acids (11 parts) are in the form of a yellow, grease-like substance having a neutral equivalent of 132. This product is readily soluble in water and gives a solution which forms a foam when shaken.

Example VI

A pressure vessel is charged with 40 parts of magnesium sulfite hexahydrate, 130 parts of water, 30 parts of isooctane, and 2 parts of carbon tetrachloride. The vessel is closed and heated to 119–121° C. under 830–955 atmospheres of ethylene pressure for 7.75 hours during which time a total pressure drop of 780 atmospheres is observed. The reaction mixture at the end of the run is a wet solid. It is filtered. The residue is washed thoroughly with water, and dried, leaving 59.5 parts of white solid. This is mixed with dilute (2 per cent) aqueous hydrochloric acid whence a large amount of sulfur dioxide is liberated, showing that this insoluble part is partly unreacted magnesium sulfite. The acid-washed precipitate, after drying, amounts to 46.5 parts and is a white, amorphous powder, which is shown to be polyethylene. The original aqueous filtrate is evaporated to dryness, leaving 12 parts of a white, salt-like solid which is soluble in water. This solid product contains magnesium alkanesulfonates. The aqueous solution of the product gives a surface-active solution upon acidification with hydrochloric acid.

Example VII

A pressure vessel is charged as described in Example I with 150 parts of water, 20 parts of sodium bisulfite, 5 parts of carbon tetrachloride, and 0.6 part of benzoyl peroxide. The vessel is closed, heated at 120–121° C. under 715–990 atmospheres of propylene pressure for 10.3 hours, cooled, and discharged. The reaction mixture is found to consist of a small amount of any oily material and a large amount of an aqueous solution. The aqueous solution which contains the potassium alkanesulfonates formed in the reaction is evaporated to dryness and leaving 26.6 parts of white solid residue. The free alkanesulfonic acids isolated from this product by treatment with hydrochloric acid as described in Example II amount to 21.5 parts and have an average neutral equivalent of 138. The product is readily soluble in water. The aqueous solutions give a good foam when shaken.

Example VIII

A pressure vessel is charged as in Example I with 120 parts of water, 20 parts of sodium bisulfite, and 60 parts of carbon tetrachloride and the pH of the mixture is adjusted to 3.68 with hydrochloric acid. The vessel is closed and heated at 119–122° C. under 400–500 atmospheres of ethylene pressure for 11 hours during which time a total pressure drop of 965 atmospheres is observed. The product is discharged from the reactor and the aqueous phase is separated from the non-aqueous phase. The aqueous phase yields 30 parts of a salt-like solid by evaporation of the water. Aqueous solutions of this product give an abundant foam when shaken. Twenty (20) parts of the salt-like solid are subjected to extraction in a continuous outfit, first with ether and then with absolute ethanol. The ether and ethanol-insoluble part which consists principally of sodium alkanesulfonates of the formula $$H(CH_2CH_2)_nSO_3Na$$

and amounts to 16 parts is thoroughly mixed at room temperature with 50 parts by volume of concentrated (37 per cent) hydrochloric acid, filtered, and the filtrate is evaporated to dryness at 100° C. in a gentle air current. A black oil amounting to 13 parts is left. It is dissolved in 50 parts by volume of absolute ethanol, treated while hot with 5 parts of decolorizing carbon, filtered, and the alcohol is evaporated under reduced pressure from the filtrate. Thirteen (13) parts of a clear, light brown oil is left. This oil is free from ionic or organically bound chlorine, contains sulfur and has a neutral equivalent of 196. This corresponds to alkanesulfonic acids of the formula $H(CH_2CH_2)_nSO_3H$ in which the average value of $n$ is 4. The product is readily soluble in water to give a solution which forms a foam when shaken and does not form a precipitate when treated with calcium chloride or magnesium sulfate solution.

From the non-aqueous phase of the reaction mixture, 30 parts of a steam volatile oil and 74 parts of a non-steam volatile grease-like material are obtained. These water-insoluble products are ethylene/carbon tetrachloride telomers.

Example IX

A pressure vessel is charged with 100 parts of an aqueous solution containing 13 per cent by weight of sodium bisulfite, 20 parts of isooctane and 0.4 part of benzoyl peroxide. The vessel is closed and heated at 93–95° C. for 10.75 hours under 840–960 atmospheres of ethylene pressure. The vessel is discharged and the aqueous phase, after separation from the organic phase, is evaporated to dryness. The residue is extracted with hot absolute ethanol and the ethanol extract is evaporated to dryness leaving 1.8 parts of a solid which contains 22.37 per cent sulfur indicating that this product is sodium alkanesulfonate of the type $H(CH_2CH_2)_nSO_3Na$ where $n$ is greater than one.

Example X

Example IX is repeated except that no benzoyl peroxide is added to the reactants. The yield of alcohol-soluble part is 2.1 parts which contains 19.30 per cent sulfur. This analysis corresponds fairly well to the theoretical analysis for sodium butanesulfonate (i. e., 20.0 per cent).

The taxogen the present invention can be ethylene, propylene, or mixtures thereof. These materials need not be absolutely pure, but can be mixed with other gaseous monoolefins such as the butylenes. Mixtures of gaseous monoolefins obtained from petroleum cracking operations are satisfactory, provided such mixtures do not contain substantial amounts of diolefins.

Any water-soluble sulfite or bisulfite may be used as the telogen in this process, but the sulfites and bisulfites of the alkali metals are preferred. In addition to the metallic salts of sulfurous acid, the ammonia and amine salts may also be used, though these are not members of the preferred class of telogens. As specific examples of the preferred class of telogens, sodium bisulfite, sodium sulfite, potassium bisulfite, potassium sulfite, potassium pyrosulfite (meta-bisulfite) and lithium sulfite are cited. Less preferred examples include the sulfites of magnesium, calcium, zinc, and strontium. Sulfurous acid or aqueous sulfur dioxide is not operable because it gives polysulfone resin-type products with olefins.

The process is preferably carried out in water or a mixture of water and an inert organic liquid as a reaction medium. Any other liquid which is a solvent for the telogen, yet which does not enter into chemical reaction with the telogen may be used.

Pressures of 400 atmospheres or above are required for the process of this invention as at lower pressures no appreciable amount of telomer is formed, perhaps due to the fact that the simple addition of equimolar amounts of the sulfurous acid salt to the olefin is the major reaction. Pressures of 700 to 1000 atmospheres are quite satisfactory, and, generally speaking, the higher the pressure employed the higher the molecular weight and yield of the product obtained. The ultimate pressure for the reaction is limited only by the mechanical strength of the equipment available. Temperatures in the range of about 90° C. to 200° C. are satisfactory, the range of about 115–125° C. being generally preferred. The yield and molecular weight of the product will usually depend directly on the concentration of the taxogen in the system. Since the process is carried out above the critical temperature of both propylene and ethylene, the concentration of taxogen in the system varies directly with the pressure, but inversely with the temperature. Hence, it is preferred to operate at or near the lowest temperature at which the desired telomerization will proceed at a reasonable rate. This has been found by experiment to be in the range of 115–125° C.

Catalysts do not appear to be required for the process of this invention, although it is quite possible that traces of oxygen function as a catalyst where no catalyst is expressly added. However, telomerization catalysts, i. e., agents which are effective as catalysts for the polymerization of ethylene or its homologues, but ineffective as catalysts for the Friedel-Crafts reactions, can be used in the process of this invention. Thus, peroxygen compounds such as benzoyl peroxide, ascaridole, sodium peroxide, hydrogen peroxide, and persulfates can be used, as can molecular oxygen. The process can be carried out in the presence of polyhalogenated hydrocarbons such as carbon tetrachloride, chloroform, hexachloroethane, and hexachlorobenzene, which seem to act as promoters for the reaction of olefins with salts of sulfurous acid. Some of these promoters may also enter into combination (telomerize) with the olefins by the process of telomerization as described in U. S. application Serial No. 438,466, filed April 10, 1942. The products of the present invention are readily separated from the polyhalogen compound telomers by virtue of the fact that the sulfur compound telomers are soluble in water, while the halogen compound telomers are not.

The time required for completion of the reaction of this process will depend upon the individual reactants, temperature, pressure, etc., being used, but will normally be in the range of about 30 minutes to 10 hours.

Although the reaction has been specifically described only as a batch procedure, the process of the invention can be carried out as a batch, semi-continuous or continuous flow process.

The products of the process of this invention are alkanesulfonic acids and their water-soluble salts. They are surface active or capillary active materials and they can be used in processes involving wetting, dispersing, penetrating, detergling, emulsifying, frothing, and similar phenomena. As already described in the examples, the free acids are readily obtained from their salts, which are the telomers, and the acids can be converted by known methods to sulfonyl halides, esters and amides which are useful as chemical intermediates, solvents, softening agents, plasticizers, etc.

It is apparent that many widely different embodiments of this invention may be made without departing from the spirit and scope thereof, and, therefore, it is not intended to be limited except as indicated in the appended claims.

I claim:

1. A process for the preparation of surface active products containing one sulfonic acid group and a plurality of units corresponding to an olefin of less than four carbon atoms which comprises reacting said olefin with an aqueous solution of a water-soluble salt of sulfurous acid at a temperature of 90° C. to 200° C. and a pressure of at least 400 atmospheres.

2. A process for the preparation of surface active products containing one sulfonic acid group and a plurality of units corresponding to an olefin of less than four carbon atoms which comprises reacting said olefin with an aqueous solution of a water-soluble alkali metal salt of sulfurous acid at a temperature of 90° C. to 200° C. and a pressure of at least 400 atmospheres.

3. A process for the preparation of surface active products containing one sulfonic acid group and a plurality of $-CH_2-CH_2-$ units which comprises reacting ethylene with an aqueous solution of a water-soluble salt of sulfurous acid at a temperature of 90° C. to 200° C. and a pressure of at least 400 atmospheres.

4. A process for the preparation of surface active products containing one sulfonic acid group and a plurality of $-CH_2-CH_2-$ units which comprises reacting ethylene with an aqueous solution of a water-soluble alkali metal salt of sulfurous acid at a temperature of 90° C. to 200° C. and a pressure of at least 400 atmospheres.

5. A process for the preparation of surface active products containing one sulfonic acid group and a plurality of $-CH_2-CH_2-$ units which comprises reacting ethylene with an aqueous solution of an alkali metal bisulfite at a temperature of about 115° C. to 125° C. and a pressure of 700 to 1000 atmospheres and in the presence of carbon tetrachloride.

6. A process for the preparation of surface active products containing one sulfonic acid group and a plurality of $-CH_2-CH_2-$ units which comprises reacting ethylene with an aqueous solution of sodium bisulfite at a temperature of about 90° C. to 200° C. and a pressure of at least 400 atmospheres.

7. A process for the preparation of surface active products containing one sulfonic acid group and a plurality of $-CH_2-CH_2-$ units which comprises reacting ethylene with an aqueous solution of sodium bisulfite at a temperature of about 115° C. to 125° C. and a pressure of 700 to 1000 atmospheres and in the presence of carbon tetrachloride.

8. A process for the preparation of surface active products containing one sulfonic acid group and a plurality of —$CH_2$—$CH_2$— units which comprises reacting ethylene with an aqueous solution of sodium bisulfite at a temperature of about 90° C. to 200° C. and a pressure of at least 400 atmospheres, recovering the water-soluble salt thus produced, reacting this salt with hydrochloric acid and recovering the resulting surface-active sulfonic acid, having a formula H—($CH_2$—$CH_2$)$_n$—$SO_3$H wherein $n$ is an integer greater than one.

9. A process for the preparation of surface active products containing one sulfonic acid group and a plurality of —$CH_2$—$CH_2$— units which comprises reacting ethylene with an aqueous solution of sodium bisulfite at a temperature of about 115° C. to 125° C. and a pressure of 700 to 1000 atmospheres and in the presence of carbon tetrachloride, recovering the water-soluble alkanesulfonate thus produced, reacting this salt with hydrochloric acid and recovering the resulting surface-active sulfonic acid, having a formula H—($CH_2$—$CH_2$)$_n$—$SO_3$H wherein $n$ is an integer greater than one.

10. A process for the preparation of surface active products containing one sulfonic acid group and a plurality of —$CH_2$—$CH_2$— units which comprises reacting, in the presence of a peroxygen catalyst, ethylene with an aqueous solution of sodium bisulfite at a temperature of about 90° C. to 200° C. and a pressure of at least 400 atmospheres, recovering the water-soluble salt thus produced, reacting this salt with hydrochloric acid and recovering the resulting surface-active sulfonic acid, having a formula $$H—(CH_2—CH_2)_n—SO_3H$$

wherein $n$ is an integer greater than one.

11. A process for the preparation of surface active products containing a plurality of units corresponding to an olefin of less than four carbons and one alkali metal neutralized sulfonic acid group which comprises reacting said olefin with an aqueous solution of an alkali metal salt of sulfurous acid at a temperature of 90° C. to 200° C. and a pressure of at least 400 atmospheres and isolating the alkali metal sulfonate.

WILLIAM E. HANFORD.

Certificate of Correction

Patent No. 2,398,426.  April 16, 1946.

WILLIAM E. HANFORD

It is hereby certified that error appears in the printed specification of the above numbered patent requiring correction as follows: Page 2, first column, line 55, Example 1, for "sulfate" read *sulfite*; and that the said Letters Patent should be read with this correction therein that the same may conform to the record of the case in the Patent Office.

Signed and sealed this 13th day of August, A. D. 1946.

[SEAL]

LESLIE FRAZER,
*First Assistant Commissioner of Patents.* comprises reacting ethylene with an aqueous solution of sodium bisulfite at a temperature of about 115° C. to 125° C. and a pressure of 700 to 1000 atmospheres and in the presence of carbon tetrachloride.

8. A process for the preparation of surface active products containing one sulfonic acid group and a plurality of —$CH_2$—$CH_2$— units which comprises reacting ethylene with an aqueous solution of sodium bisulfite at a temperature of about 90° C. to 200° C. and a pressure of at least 400 atmospheres, recovering the water-soluble salt thus produced, reacting this salt with hydrochloric acid and recovering the resulting surface-active sulfonic acid, having a formula H—($CH_2$—$CH_2$)$_n$—$SO_3$H wherein $n$ is an integer greater than one.

9. A process for the preparation of surface active products containing one sulfonic acid group and a plurality of —$CH_2$—$CH_2$— units which comprises reacting ethylene with an aqueous solution of sodium bisulfite at a temperature of about 115° C. to 125° C. and a pressure of 700 to 1000 atmospheres and in the presence of carbon tetrachloride, recovering the water-soluble alkanesulfonate thus produced, reacting this salt with hydrochloric acid and recovering the resulting surface-active sulfonic acid, having a formula H—($CH_2$—$CH_2$)$_n$—$SO_3$H wherein $n$ is an integer greater than one.

10. A process for the preparation of surface active products containing one sulfonic acid group and a plurality of —$CH_2$—$CH_2$— units which comprises reacting, in the presence of a peroxygen catalyst, ethylene with an aqueous solution of sodium bisulfite at a temperature of about 90° C. to 200° C. and a pressure of at least 400 atmospheres, recovering the water-soluble salt thus produced, reacting this salt with hydrochloric acid and recovering the resulting surface-active sulfonic acid, having a formula $$H—(CH_2—CH_2)_n—SO_3H$$

wherein $n$ is an integer greater than one.

11. A process for the preparation of surface active products containing a plurality of units corresponding to an olefin of less than four carbons and one alkali metal neutralized sulfonic acid group which comprises reacting said olefin with an aqueous solution of an alkali metal salt of sulfurous acid at a temperature of 90° C. to 200° C. and a pressure of at least 400 atmospheres and isolating the alkali metal sulfonate.

WILLIAM E. HANFORD.

Certificate of Correction

Patent No. 2,398,426.

April 16, 1946.

WILLIAM E. HANFORD

It is hereby certified that error appears in the printed specification of the above numbered patent requiring correction as follows: Page 2, first column, line 55, Example 1, for "sulfate" read *sulfite*; and that the said Letters Patent should be read with this correction therein that the same may conform to the record of the case in the Patent Office.

Signed and sealed this 13th day of August, A. D. 1946.

[SEAL]

LESLIE FRAZER,
*First Assistant Commissioner of Patents.*